US008930736B2

(12) United States Patent
James

(10) Patent No.: US 8,930,736 B2
(45) Date of Patent: Jan. 6, 2015

(54) INFERRED ELECTRICAL POWER CONSUMPTION OF COMPUTING DEVICES

(75) Inventor: Sean M. James, Olympia, WA (US)

(73) Assignee: Microsoft Corporation, Redmond, WA (US)

(*) Notice: Subject to any disclaimer, the term of this patent is extended or adjusted under 35 U.S.C. 154(b) by 285 days.

(21) Appl. No.: 13/409,530

(22) Filed: Mar. 1, 2012

(65) Prior Publication Data

US 2013/0232369 A1    Sep. 5, 2013

(51) Int. Cl.
| G06F 1/32 | (2006.01) |
| G06F 1/00 | (2006.01) |
| G01R 21/00 | (2006.01) |
| G06F 15/00 | (2006.01) |
| G06F 15/16 | (2006.01) |
| G06F 11/30 | (2006.01) |

(52) U.S. Cl.
CPC .......... G06F 11/3062 (2013.01); G06F 1/3206 (2013.01)
USPC ............. 713/320; 713/300; 702/60; 702/186; 709/217

(58) Field of Classification Search
None
See application file for complete search history.

(56) References Cited

U.S. PATENT DOCUMENTS

| 7,793,120 B2 | 9/2010 | McGrane et al. |
| 7,793,126 B2 | 9/2010 | McGrane et al. |
| 7,904,287 B2* | 3/2011 | Lefurgy et al. ................. 703/21 |
| 8,266,458 B2* | 9/2012 | Inoue ............................ 713/300 |
| 2009/0228726 A1 | 9/2009 | Malik et al. |
| 2009/0235097 A1 | 9/2009 | Hamilton et al. |
| 2009/0265564 A1 | 10/2009 | Clemo et al. |
| 2010/0050008 A1* | 2/2010 | Allalouf et al. ............... 713/340 |
| 2010/0312873 A1 | 12/2010 | Loboz et al. |
| 2011/0016337 A1 | 1/2011 | Cepulis |
| 2011/0191609 A1* | 8/2011 | Van Bokhoven et al. ..... 713/310 |
| 2011/0213508 A1 | 9/2011 | Mandagere et al. |

OTHER PUBLICATIONS

"Data Center Energy Efficiency with Intel® Power Management Technologies", Retrieved at <<http://software.intel.com/sites/datacentermanager/power_mgmt_tech.pdf>>, Feb. 2010, pp. 4.
"IBM Systems Director Active Energy Manager for Power Systems", Retrieved at <<http://www-01.ibm.com/common/ssi/rep_ca/5/872/ENUSAP08-0275/ENUSAP08-0275.PDF>>, Nov. 11, 2008, pp. 15.

(Continued)

Primary Examiner — Stefan Stoynov
(74) Attorney, Agent, or Firm — Jim Sfekas; Kate Drakos; Micky Minhas

(57) ABSTRACT

The power consumption of a computing device is inferred from the utilization rates of individual components of the computing device and a utilization-to-power-consumption transfer function that was derived by benchmarking that, or an analogous, computing device. The inferred power consumption of a computing device is aggregated to infer the power consumption of various groups and super-groups of computing devices. The historical power consumption of computing devices is inferred based on the utilization rates of individual components of the computing devices at relevant times in the past. Historical power consumption is used to derive a power consumption profile of a computing device and the inferred current power consumption of such a computing device is compared to such a power consumption profile, and to the historical power consumption, to identify deviations therefrom, which can provide proactive detection of potential hardware faults, software glitches, or other errors.

20 Claims, 6 Drawing Sheets

(56) References Cited

OTHER PUBLICATIONS

Femal, et al., "Boosting Data Center Performance Through Non-Uniform Power Allocation", Retrieved at <<http://ieeexplore.ieee.org/stamp/stamp.jsp?tp=&arnumber=1498069>>, Proceedings of Second International Conference on Autonomic Computing, Jun. 13-16, 2005, pp. 1-12.

Khargharia, et al., "Autonomic Power & Performance Management for Large-Scale Data Centers", Retrieved at <<http://ieeexplore.ieee.org/stamp/stamp.jsp?tp=&arnumber=4228238>>, Proceedings of IPDPS 2007, Mar. 26-30, 2007, pp. 1-8.

Jenne, John, "Dell Energy Smart Architecture (DESA) for 11G Rack and Tower Servers", Retrieved at <<http://www.dell.com/downloads/global/products/pedge/en/poweredge-11g-desa-white-paper.pdf>>, 2009, pp. 44.

Volodarsky, Mike, "IIS 7.0 Server-Side", Retrieved at <<http://mvolo.com/blogs/serverside/archive/2009/02/01/Analyzing-server-power-consumption-and-costs.aspx>>, Feb. 1, 2009, pp. 8.

Choi, et al., "Profiling, Prediction, and Capping of Power Consumption in Consolidated Environments", Retrieved at <<http://csl.cse.psu.edu/publications/powerpred.pdf>>, Proceedings of Modeling, Analysis and Simulation of Computers and Telecommunication Systems, 2008. MASCOTS 2008, Sep. 8-10, 2008, pp. 1-10.

\* cited by examiner

INFERRED ELECTRICAL POWER CONSUMPTION OF COMPUTING DEVICES

BACKGROUND

The throughput of communications, between multiple computing devices that are transmitted via network connections, continues to increase. For example, modern networking hardware enables physically separate computing devices to communicate with one another orders of magnitude faster than was possible with prior generations of networking hardware. Furthermore, high-speed network communication capabilities are being made available to a greater number of people, both in the locations where people work, and in their homes. As a result, an increasing amount of data and services can be meaningfully provided via such network communications. For example, audio and video entertainment can now be stored in a single, centralized location and accessed by multiple individuals "on-demand" by streaming such content, via network communications, from the centralized location to the computing devices utilized by those multiple individuals at their respective locations. Similarly, a greater variety of services can be provided over network communications including, for example, services that were traditionally executed locally on individual computing devices.

To provide such data and services, via network communications, from a centralized location, the centralized location typically comprises hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "datacenter". With the increasing availability of high-speed network communication capabilities, and thus the increasing provision of data and services from centralized locations, as well as the traditional utilization of datacenters, such as the provision of advanced computing services and massive amounts of computing processing capability, the size and quantity of datacenters continues to increase.

Data centers often consume large quantities of electrical power, especially by the computing devices themselves. Increasingly, the cost of such electrical power is becoming a primary determinant in the economic success of a data center. Consequently, it can be desirable to monitor the power consumption of computing devices in a data center. Such power monitoring is performed by an independent device that is connected between whatever computing device's power consumption is being measured and the power source. Such an independent power monitoring device then monitors the electrical power that passes through it as such power is consumed by the computing device whose power consumption is being measured.

Unfortunately, independent power monitoring devices can be expensive to purchase and install especially if each computing device from among the thousands of computing devices in a typical data center is to be independently monitored since such a scenario would require the purchase and installation of thousands of such independent power monitoring devices. Additionally, power meters can also be very inaccurate at the lower current levels at which computing devices tend to operate. If, alternatively, such independent power monitoring devices are installed to monitor the power for collections of computing devices in aggregate, then their cost can be reduced, since a reduced number of such independent power monitoring devices would be required. However, such an alternative, less-expensive arrangement loses the ability to monitor the power consumption of individual computing devices, since each independent power monitoring device would only be able to monitor the power consumed, in aggregate, by all of the computing devices drawing power through such an independent power monitoring device and would not be able to distinguish the power consumed by any one specific computing device.

SUMMARY

In one embodiment, a computing device can be benchmarked to obtain a utilization-to-power-consumption transfer function that can subsequently be utilized to infer the electrical power being consumed by such a computing device based upon the utilization of various components of such a computing device.

In another embodiment, specific components of a computing device can be benchmarked independently and individual component utilization-to-power-consumption transfer functions for each of those specific components can be generated. An aggregate computing device utilization-to-power-consumption transfer function can be generated from the individual component utilization-to-power-consumption transfer function, as well as from the amount of power consumed by the computing device at idle.

In a further embodiment, the power consumption of a computing device can be inferred from either current utilization data or from historical utilization data that can have been retained. Such historical utilization data can yield a power consumption profile of the computing device against which a current power consumption can be compared in order to proactively detect potential hardware failures, software failures or other abnormalities.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
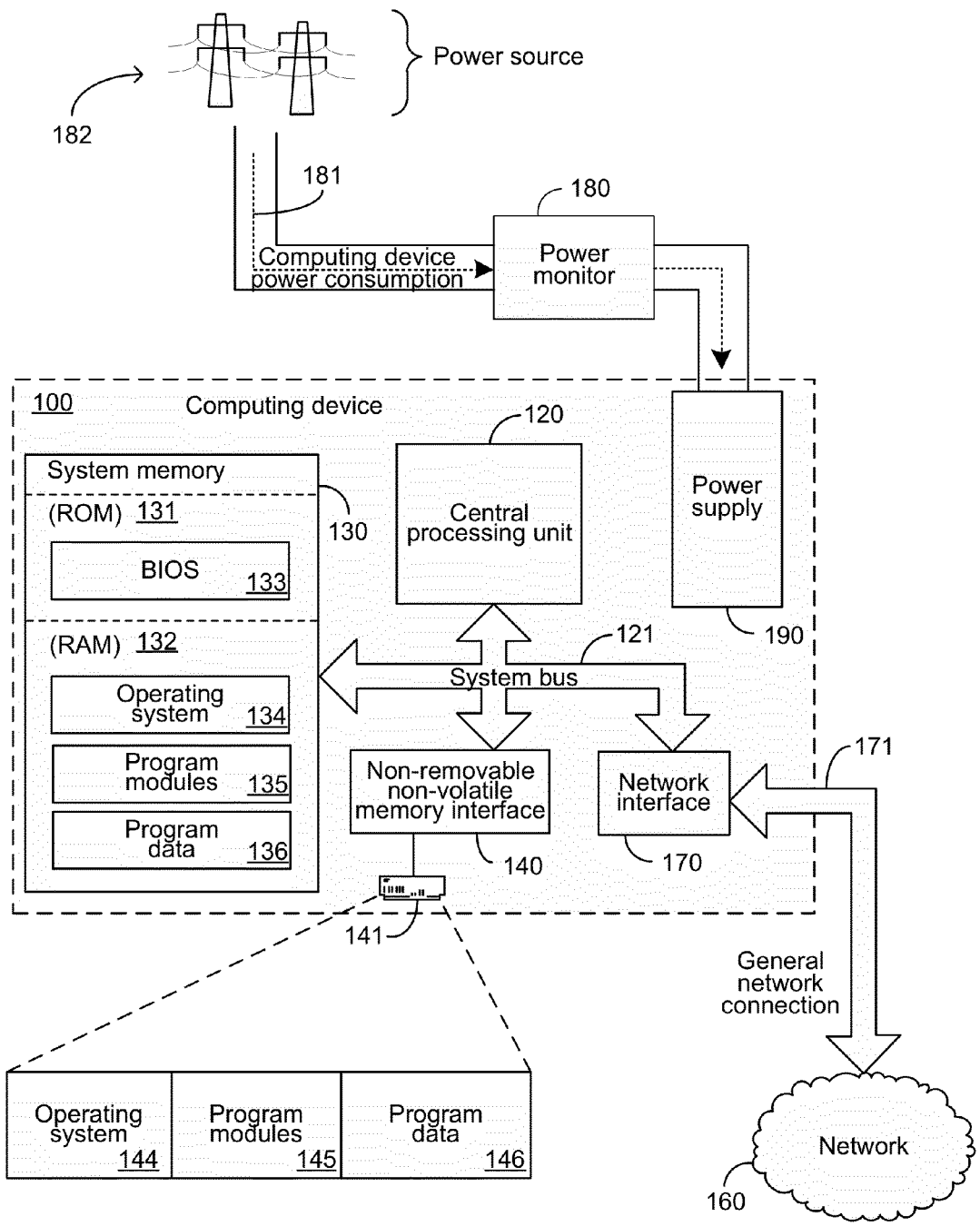
FIG. 1 is a block diagram of an exemplary system by which the power consumption of a computing device can be measured.

The following description relates to inferring the power consumption of a computing device from the utilization rates of individual components of the computing device and a utilization-to-power-consumption transfer function that was derived by benchmarking that, or an analogous, computing device. The inferred power consumption of a computing device can then be aggregated to infer the power consumption of various groups and super-groups of computing devices, such as all of the computing devices in a physical structure, such as a rack, or all of the computing devices in a logical grouping, such as a node. The historical power consumption of computing devices can also be inferred based on the utilization rates of individual components of the computing devices at relevant times in the past, which can have been retained, and the aforementioned utilization-to-power-consumption transfer function. Historical power consumption can be utilized to derive a power consumption profile of a computing device and the inferred current power consumption of such a computing device can be compared to such a power consumption profile, and to the historical power consumption, to identify deviations therefrom, which can provide proactive detection of potential hardware faults, software glitches, or other errors. By inferring the power consumption of a computing device from utilization information, which is typically already available from components executing on a computing device, the power consumption of individual computing devices can be measured without the substantial investment of resources required by current external, dedicated power consumption monitors.

For purposes of illustration, the techniques described herein make reference to specific components of modern computing devices and their power consumption, including, for example, central processing units, random access memory modules, storage devices and other like components. Such references, however, are strictly exemplary and are not intended to limit the mechanisms described to the specific examples provided. Indeed, the techniques described are applicable to any power consuming device whose power consumption is based on the level of utilization of individual components of such a power consuming device, where the level of utilization of such components can be determined.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

With reference to FIG. 1, an exemplary computing device 100 is illustrated, which can be powered from a power source 182. Typically, the power source 182 will be the electrical grid, although such is not required by the mechanisms described in detail below. Indeed, the mechanisms described are equally applicable to inferring the power consumption of a device, such as the computing device 100, irrespective of the source from which the computing device 100 draws its power, such as the exemplary power source 182.

Typically, to measure the power consumed by the computing device 100, an external, independent power monitor, such as the power monitor 180, is connected between the computing device 100 and the power source 182. With such a connection, the power monitor 180 can determine the power consumed by the computing device 100 by measuring the power passing through the power monitor 180 that is drawn by the computing device 100 from the power source 182. For example, the power monitor 180 can include voltmeter and ammeter capabilities so as to measure the voltage being supplied to the computing device 100 by the power source 182 and so as to measure the current being drawn by the computing device 100 from the power source 182. As is known by those skilled in the art, with such current and voltage measurements, the power monitor 180 can determine the electrical power consumed by the computing device 100.

To provide context for the descriptions below, the exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates an operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, non-volatile media. As utilized herein, the terms "hard disk drive", "hard disk" and "drive" mean any one or more removable/non-removable, volatile/nonvolatile computer storage media that are used with the exemplary computing device 100 including, but not limited to, magnetic storage devices, solid state storage devices, tape cassettes, flash memory cards, digital versatile disks, digital video tape and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing an operating system 144, other program modules 145, and program data 146. Note that these components can either be the same as or different from operating system 134, other program modules 135 and program data 136. Operating system 144, other program modules 145 and program data 146 are given different numbers here to illustrate that, at a minimum, they are different copies.

Of relevance to the descriptions below, the computing device 100 may operate in a networked environment using logical connections to one or more remote computers. For simplicity of illustration, the computing device 100 is shown in FIG. 1 to be connected to a network 160 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170, which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

The exemplary computing device 100 can also comprise a power supply 190 that can convert the power provided by the power source 182 into a form of power that can be consumed by the components of the exemplary computing device 100. For example, a desktop personal computing device can comprise a power supply 190 that can convert 120 volt alternating current into five and twelve volt direct current. As another example, server personal computing devices can comprise power supplies that convert 208 volt alternating current to, for example, twelve volt direct current power. Although the power supply 190 is illustrated as a single component that is located physically within exemplary computing device 100, the mechanisms described below are not limited to internal power supplies and are equally applicable to computing devices that utilize one or more external power supplies, such as racks of server computing devices that can utilize multiple power distribution units and power supply units.

As will be recognized by those skilled in the art, the power consumed by the exemplary computing device 100 is mostly comprised of the power consumed by individual components of the exemplary computing device 100, such as, for example, the components enumerated above. From among those components, many of them consume an approximately static amount of power irrespective of the amount of utilization of the computing device. For example, the power consumed by a peripheral interface is approximately the same irrespective of whether the computing device is performing intensive computing or whether the computing device is essentially idling. By contrast, the power consumed by some components of the computing device do vary to a meaningful degree depending upon the utilization of the computing device, or, more specifically, upon the utilization of the relevant component of the computing device. For example, the power consumed by the CPU 120 of the exemplary computing device 100 can be substantially higher when the CPU 120 is being utilized at its maximum capacity than the power consumed by the CPU 120 when the computing device 100 is merely idling and not performing any meaningful computation.

Consequently, in one embodiment, the power consumption of a computing device can be inferred based on the utilization of that computing device. More specifically, the power consumption of a computing device can be inferred based on the amount of power consumed by that computing device at idle as increased by any incremental power consumed by components of the computing device as those components' utilization levels increase. The power consumption of the computing device at idle can account for the power consumption of those components of the computing device whose power consumption remains approximately static irrespective of the amount of utilization of the computing device. The incremental power consumption of individual components, based on an amount of utilization of the computing device, can then be added to such an idle power consumption to infer the power consumed by the computing device as a whole.

As will be recognized by those skilled in the art, however, the power consumption of a computing device in the aggregate, or of individual components of a computing device whose power consumption varies based on utilization, may not be linearly related to the utilization of the computing device or of specific individual components thereof. Thus, for example, a computing device may not necessarily consume twice as much power when being utilized at 100% of its capabilities as it does when being utilized at only 50% of its capabilities. Similarly, an individual component of the computing device, such as, for example, the CPU 120, may not necessarily consume twice as much power when being utilized at 100% of its capabilities as it does when being utilized at only 50% of its capabilities.

Figure 2:
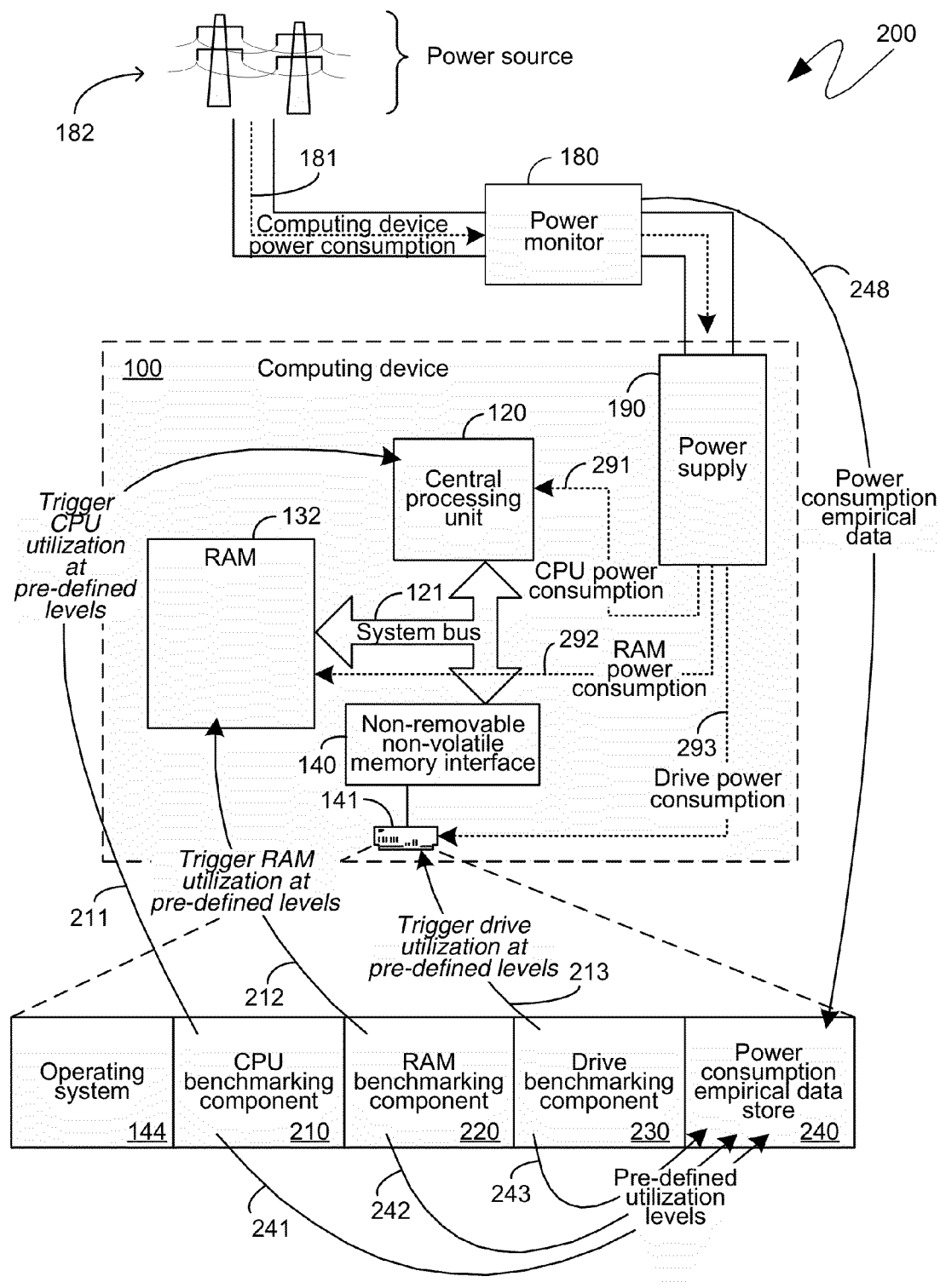
FIG. 2 is a block diagram of an exemplary benchmarking of the power consumption of a computing device.

As such, in one embodiment, a computing device can be tested to empirically determine a power-consumption-to-utilization transfer function that can subsequently be utilized to infer a power consumption of that computing device based on the utilization of that computing device. Turning to FIG. 2, the system 200 shown therein illustrates exemplary computing device 100 that was illustrated in FIG. 1 and described in detail above, connected to the power source 182 through the power monitor 180, as also described previously. Executing on the computing device, such as from computer executable instructions that were stored on the drive 141, can be various benchmarking components such as a CPU benchmarking component 210, a RAM benchmarking component 220 and a drive benchmarking component 230. Additionally, the drive 141 can also comprise a power consumption empirical data store 240 that can receive power consumption empirical data 248 from the power monitor 180.

Initially, in one embodiment, the computing device 100 can be operated in what is commonly known as an "idle" state, wherein the computing device 100 is operational but is not performing any meaningful computation on behalf of a user. While in such an idle state, the computing device power consumption 181 can be measured by the power monitor 180 and can be provided to the power consumption empirical data store 240 as the power consumption empirical data 248. Subsequently, a benchmarking component, such as the CPU benchmarking component 210, can execute and can trigger utilization 211 of the CPU 120, which, as will be recognized by those skilled in the art, can cause the computing device power consumption 181 to increase, by, more specifically, increasing the amount of the CPU power consumption 291 that is consumed by the CPU 120. Such an increase in the CPU power consumption 291 can result in a commensurate increase in the computing device power consumption 181, which can be detected by the power monitor 180 and can be recorded in the power consumption empirical data store 240 as the power consumption empirical data 248 provided to the power consumption empirical data store 240 by the power monitor 180.

In one embodiment, the CPU benchmarking component 210 can trigger utilization 211 of the CPU 120 at predefined levels or increments. For example, the CPU benchmarking component 210 can trigger utilization 211 of the CPU 120 at 100% of the CPU's processing capability. The computing device power consumption 181, which can comprise the CPU power consumption 291 of the CPU 120 operating at 100% capacity, can be detected by the power monitor 180 and can be provided, as the power consumption empirical data 248, to the power consumption empirical data store 240. The CPU benchmarking component 210 can also provide, to the power consumption empirical data store 240, an identification of the relevant component, such as the CPU 120 in the present example, and the predefined utilization level 241 at which the CPU 120 is being utilized, such as the 100% level in the present example. The predefined utilization level 241 provided to the power consumption empirical data store 240 by the CPU benchmarking component 210 can enable a subsequent correlation between such a utilization level and the CPU power consumption 291, as reflected in the computing device power consumption 181 that was observed by the power monitor 180 at that time.

As another example, the CPU benchmarking component 210 can trigger utilization 211 of the CPU 120 at 75% of the CPU's processing capability, 50% of the CPU's processing capability, or any other predefined level of utilization. In one embodiment, the CPU benchmarking component 210 can comprise computer-executable instructions that can be executed by the CPU 120 wherein, by virtue of their execution, can cause the CPU 120 to be utilized at the predefined levels of utilization 211. Standardized computer-executable instructions for "benchmarking" the computational performance of processing units such as the CPU 120 are well known to those skilled in the art and can be incorporated into the CPU benchmarking component 210. In addition, the CPU benchmarking component 210 can take into account multiple processing units that can comprise a single CPU 120 such as, for example, multicore processing units. For example, the CPU benchmarking component 210 can trigger a 50% utilization of a multicore CPU having two cores by triggering the utilization of one of those two cores at 100% or by alternating a 100% utilization of a single core from among the two cores of such a multicore CPU.

In an analogous manner, a RAM benchmarking component 220 can trigger utilization 212 of the RAM 132, thereby causing an increase in the amount of RAM power consumption 292. The increase in the amount of RAM power consumption 292 can be reflected in an increase in the computing device power consumption 181 that can be detected by the power monitor 180 and can be provided by the power monitor 180 to the power consumption empirical data store 240 as the power consumption empirical data 248. The RAM benchmarking component 220 can, like the CPU benchmarking component 210, trigger utilization 212 of the RAM 132 at predefined levels. For example, the RAM benchmarking component 220 can trigger utilization 212 of the RAM 132 such that the data being written to the RAM 132, or being read from the RAM 132, is at 100% of the capacity of the RAM 132 to receive, or provide, such data. The RAM benchmarking component 220 can then provide an indication of the 100% utilization level to the power consumption empirical data store 240 as one of the predefined utilization levels 242, along with an identification of the corresponding component of the computing device 100, such as, in the present example, the RAM 132. The power consumption empirical data store 240 can also receive the computing device power consumption 181 of the computing device 100 when the RAM 132 is being utilized in such a manner. With such information a correlation can be determined, as will be described in detail below, between the predetermined level of utilization 212 of the RAM 132 and the increase in the RAM power consumption 292, as reflected in the increase in the computing device power consumption 181 that was detected by the power monitor 180 and provided to the power consumption empirical data store 240 as the power consumption empirical data 248. As with the CPU benchmarking component 210, the RAM benchmarking component 220 can comprise computer-executable instructions that, when executed by the exemplary computing device 100, will cause data to be written to, and read from, the RAM 132 in accordance with the predefined utilization level triggered by such a RAM benchmarking component 220.

A drive benchmarking component 230 can operate in a manner analogous to that described in detail above with reference to the CPU benchmarking component 210 and the RAM benchmarking component 220. Thus, the drive benchmarking component 230 can trigger utilization 213 of the drive 141, thereby causing the drive power consumption 293 to increase. As before, the increase in the drive power consumption 293 can result in a corresponding increase in the computing device power consumption 181 that can be detected by the power monitor 180 and can be provided, as the power consumption empirical data 248, to the power consumption empirical data store 240. As will be recognized by those skilled in the art, however, the drive 141 may not comprise an equivalent range of utilization levels as the CPU 120 or the RAM 132. For example, the CPU 120 or the RAM 132 can transition through a continuous range of utilization levels while, depending on the specific type of drive 141, the drive 141 may only comprise discrete utilization levels such as, for example, the drive 141 can be either reading data, writing data, or performing both simultaneously. Consequently, the drive benchmarking component 230 can trigger utilization 213 of the drive 141 to read a set of data, write a set of data or do both simultaneously. In one embodiment, the drive benchmarking component 230 can comprise computer-executable instructions that, when executed by the exemplary computing device 100, can generate the data to be written onto the drive 141, read from the drive 141, or simultaneously both read from and written to the drive 141, in order to utilize the drive 141 at the predefined levels. The drive benchmarking component 230 can also provide information regarding those predefined utilization levels 243 to the power consumption empirical data store 240, as well as an identification of the corresponding component of the computing device 100, namely the drive 141 in the present example, thereby enabling correlation between those predefined utilization levels 243 and the attendant increase in the drive power consumption 293, as reflected in the computing device power consumption 181 that is detected by the power monitor 180 and is also provided to the power consumption empirical data store 240 as the power consumption empirical data 248.

Figure 3:
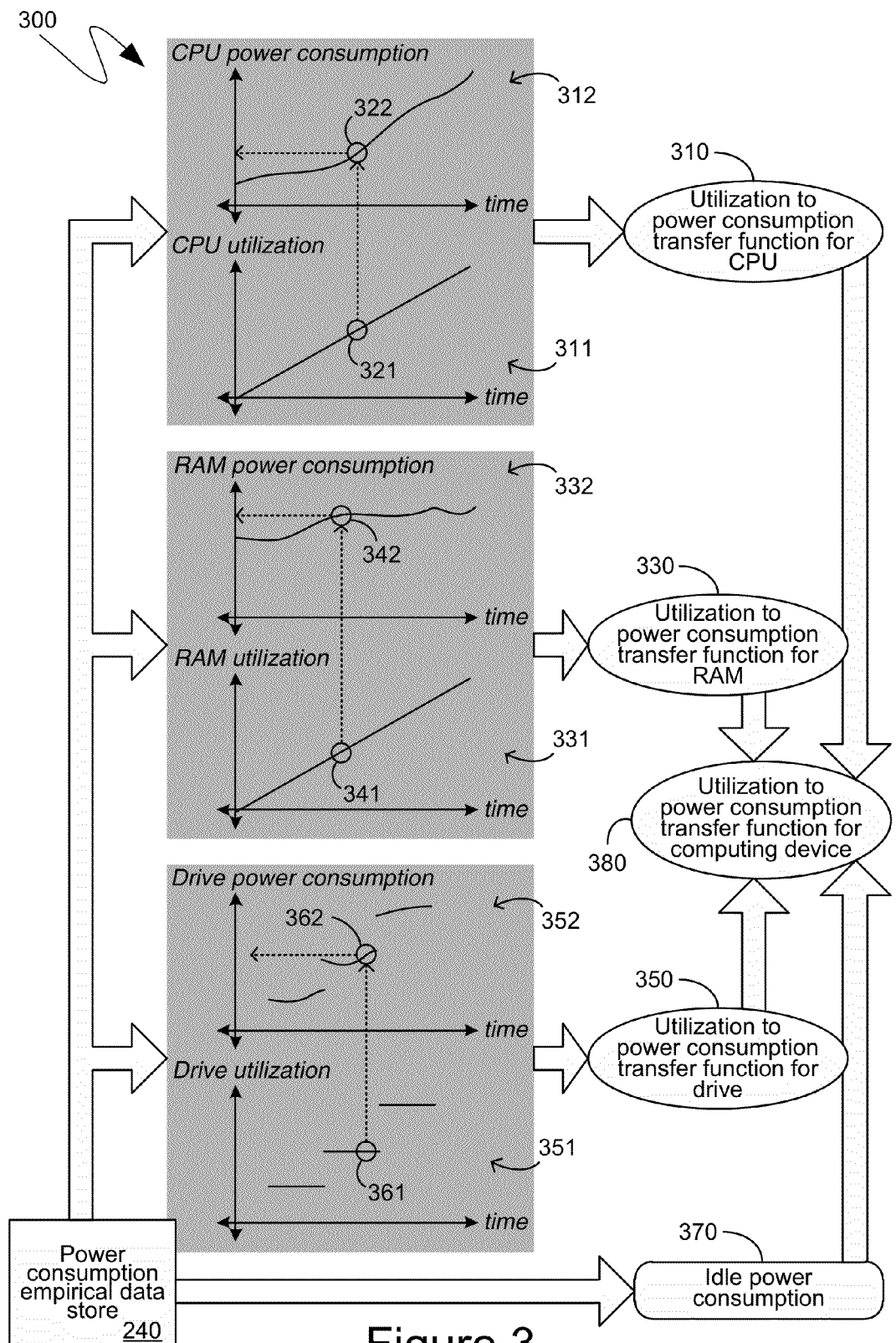
FIG. 3 is a block diagram of and exemplary derivation of a utilization-to-power-consumption transfer function for a computing device.

Turning to FIG. 3, the system 300 shown therein illustrates an exemplary embodiment by which a utilization-to-power-consumption transfer function can be derived for individual components of the computing device and for the computing device as a whole, such as exemplary computing device 100, and its components, that were illustrated in FIGS. 1 and 2 and described in detail above. As indicated previously, the power consumption empirical data store 240 can comprise information regarding the power consumption of an exemplary computing device, including the power consumption during times when specific components of the computing device were utilized at predefined utilization levels. For example, the power consumption empirical data store 240 can comprise an idle power consumption 370 that can represent the power consumed by a computing device while the computing device was in an "idle" state.

The power consumption empirical data store 240 can also comprise the power consumption of the computing device while specific components of the computing device were utilized at specific utilization levels. For example, the power consumption empirical data store 240 can comprise the power consumption of the computing device while the CPU of the computing device was utilized at predefined utilization levels such as, for example, while the CPU was utilized at 50% of its utilization capabilities. Subtracting the idle power consumption 370 from the power consumption of the computing device while the CPU was being utilized can yield an approximation of the CPU power consumption.

The graph 311, shown in the system 300 of FIG. 3, illustrates an exemplary increase in the utilization of a CPU of a computing device over a period of time during which that computing device was being tested and during which time the power consumption of the computing device was being recorded in the power consumption empirical data store 240. For example, as illustrated by the graph 311, the CPU utilization can commence at an idle state, during which the CPU is being utilized very little, and can increase in a progressive manner to a subsequent time when the CPU is being utilized at 100% of its utilization capabilities. Corresponding to such a graph 311 can be another graph 312 that can correlate the CPU power consumption during that same period of time. As indicated, the CPU power consumption, such as that reflected in the graph 312, can be approximated by subtracting the idle power consumption 370 from the power consumption of the overall computing device during the times when the CPU of the computing device was being utilized at predefined utilization levels, such as by a CPU benchmarking component, such as that described in detail above.

For example, the point 321 on the CPU utilization graph 311 can represent a utilization of the CPU at 50% of its capability. As illustrated by the system 300 of FIG. 3, such a CPU utilization can correspond to a CPU power consumption represented by the point 322 along the CPU power consumption graph 312. Similarly, other points along the CPU utilization graph 311, representing specific levels of CPU utilization that were triggered and for which power consumption data was collected, can correspond to points along the CPU power consumption graph 312. As will be recognized by those skilled in the art, given such a collection of data, as illustrated by the CPU utilization graph 311 and the CPU power consumption graph 312, a CPU utilization-to-power-consumption transfer function 310 can be generated.

The CPU utilization-to-power-consumption transfer function 310 can correlate a specific level of CPU utilization to a corresponding CPU power consumption such that, given a specific level of CPU utilization as an input to the CPU utilization-to-power-consumption transfer function 310, the transfer function 310 can output a single CPU power consumption corresponding to the input level of CPU utilization. As such, in one embodiment, the CPU utilization-to-power-consumption transfer function 310 is a one-to-one transfer function. However, in one embodiment, it is not required that the transfer function 310 be linear or even piecewise continuous. Consequently, the CPU utilization-to-power-consumption transfer function 310 can be any form of transfer function that provides a definite CPU power consumption output given any CPU utilization level as an input.

In a similar manner, the power consumption data from the power consumption empirical data store 240 can also comprise RAM power consumption, such as that illustrated by the graph 332 and a drive power consumption, such as that illustrated by the graph 352. More specifically, the power consumption empirical data store 240 can comprise the power consumption of the computing device during the time when the RAM of the computing device was being utilized at predefined levels of utilization capacity. Subtracting away the idle power consumption 370 from the power consumption of the computing device at those times can yield an approximation of the RAM power consumption, such as that illustrated by graph 332. Thus, as before, specific points along the RAM utilization graph 331 such as, for example, the point 341, representing a specific level of utilization, can correspond with a corresponding point 342 representing a specific level of RAM power consumption while the RAM was being utilized at the level of utilization represented by the point 341. Thus, as before, the RAM utilization-to-power-consumption transfer function 330 can be generated from the empirical data stored in the power consumption data store 240, namely the levels of RAM utilization, such as those illustrated by the RAM utilization graph 331, and the corresponding power consumption of the computing device which, as indicated previously, can yield the RAM power consumption, such as that illustrated by the graph 332. Also as before, the RAM utilization-to-power-consumption transfer function can be a one-to-one transfer function such that any input utilization level of the RAM can result in the RAM utilization-to-power-consumption transfer function 330 outputting a RAM power consumption. The RAM utilization-to-power-consumption transfer function 330, however, need not be linear or piecewise continuous and can conform, instead, to the data collected during testing and stored in the power consumption empirical data store 240.

A drive utilization-to-power-consumption transfer function 350 can be similarly derived to correlate utilization of a storage media, such as one or more disk drives, to the power consumed by such storage media while being utilized in such a manner. Thus, as illustrated by the system 300 of FIG. 3, the graph 351 can represent varying levels of utilization of one or more of the drives of the computing device. As indicated previously, because of the nature of certain storage media, drive utilization levels may be more discreet, as opposed to the continuous range of utilization levels that can be obtained by the CPU, the RAM, and other like components of the computing device. Thus, the exemplary drive utilization graph 351 shown in the system 300 of FIG. 3 illustrates three exemplary utilization levels corresponding to, for example, a utilization level commensurate with the reading of data, the utilization level commensurate with the writing of data, and the utilization level commensurate with simultaneous reading and writing of data. Similarly, the exemplary drive power consumption graph 352 illustrates a corresponding drive power consumption that, like the drive utilization, reflects three different bands of power consumption. A drive utilization-to-power-consumption transfer function 350 can, nevertheless, be generated such that specific drive utilization levels can have corresponding drive power consumption determined by such a transfer function. For example, a drive utilization level represented by the point 361 in the utilization graph 351 can correspond to a drive power consumption represented by the corresponding point 362 in the power consumption graph 352. As before, the drive utilization-to-power-consumption transfer function 350 need not be linear or piecewise continuous in order to provide a transfer function between levels of utilization of one or more storage media and a corresponding power consumption.

In one embodiment, a computing device utilization-to-power-consumption transfer function 380 can be generated based on the idle power consumption 370 and the utilization-to-power-consumption transfer functions of various components of the computing device. For example, the computing device utilization-to-power-consumption transfer function 380 can be the sum of the idle power consumption 370 plus the utilization-to-power-consumption transfer functions of various components of the computing device such as, for example, the CPU utilization-to-power-consumption transfer function 310, the RAM utilization-to-power-consumption transfer function 330, and the drive utilization-to-power-consumption transfer function 350. In such an embodiment, the computing device utilization-to-power-consumption transfer function 380 can accept, as input, the utilization levels of one or more of the components of the computing device such as, for example, the CPU, RAM, drive, and other like components of the computing device, and can, in response, provide an inferred power consumption of a computing device whose components were being utilized at the utilization levels provided as input.

Figure 4:
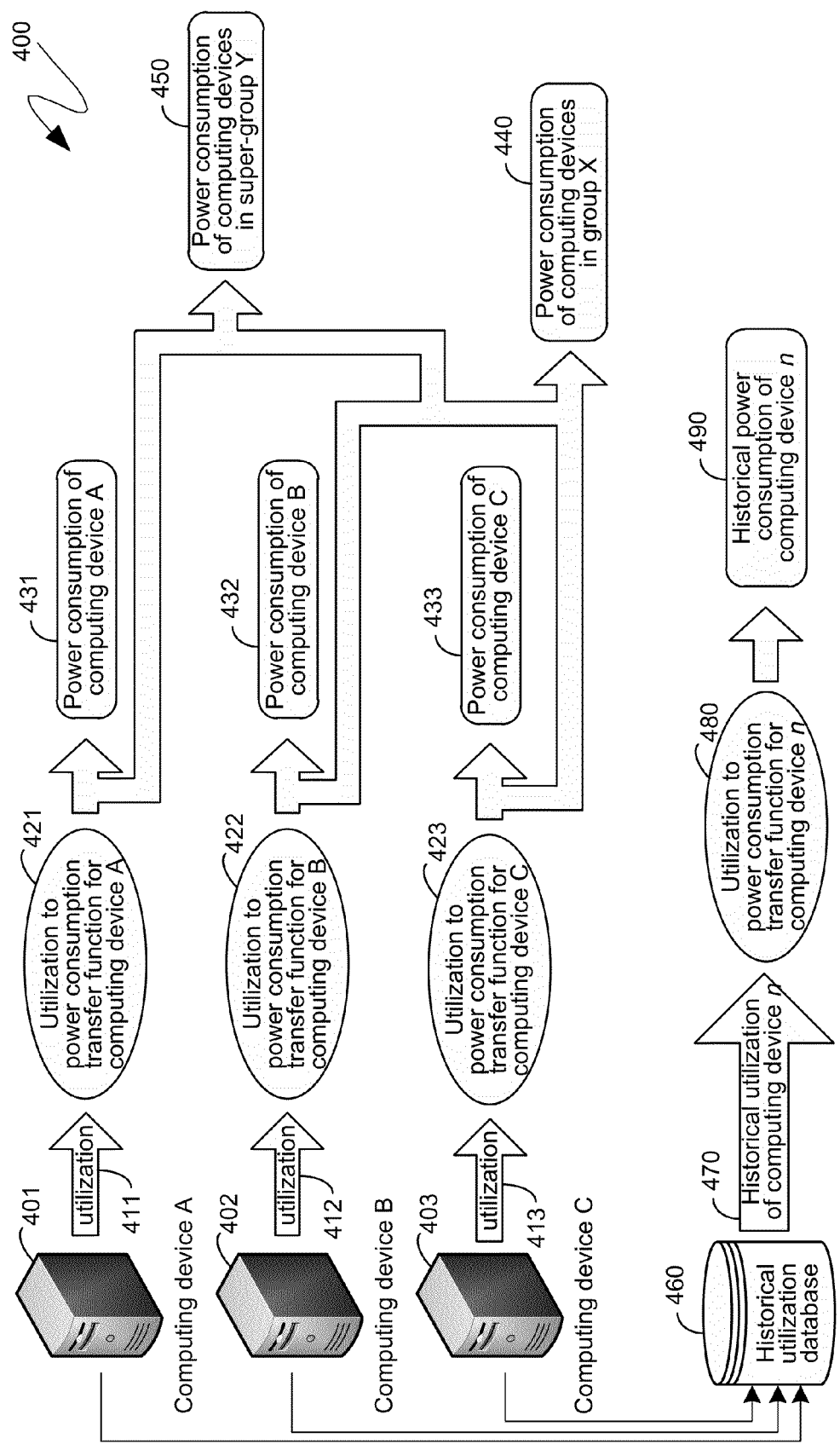
FIG. 4 is a block diagram of an exemplary mechanism for inferring the power consumption of one or more computing devices.

With such a computing device utilization-to-power-consumption transfer function 380, the power consumption of computing devices that are analogous to the computing device, whose empirical data was utilized to generate the computing device utilization-to-power-consumption transfer function 380, can be inferred. Turning to FIG. 4, the system 400 shown therein comprises three exemplary computing devices, namely the computing devices 401, 402 and 403. Each of the three computing devices 401, 402 and 403 can have associated with them computing device utilization-to-power-consumption transfer functions, namely the computing device utilization-to-power-consumption transfer functions 421, 422 and 423. In one embodiment, if the computing devices 401, 402 and 403 are all equivalent computing devices such as, for example, if the computing devices 401, 402 and 403 each comprise the same hardware, then a single computing device utilization-to-power-consumption transfer function can represent all three of the computing device utilization-to-power-consumption transfer functions 421, 422 and 423. Alternatively, if one or more of the computing devices 401, 402 and 403 differ from one another, either in configuration or in manufacture, then those computing devices, or analogs thereof, can undergo the testing described in detail above in order to generate a computing device utilization-to-power-consumption transfer function for those computing devices.

As shown in the system 400 of FIG. 4, the computing devices 401, 402 and 403 can have utilization levels 411, 412 and 413, respectively. For example, the utilization levels 411, 412 and 413 can signify the utilization or one or more of the components of the computing devices 401, 402 and 403, respectively. As indicated previously, and as will be known by those skilled in the art, such utilization can be determined by known systems and mechanisms that can be executed on the computing devices 401, 402 and 403. The utilization 411 of the computing device 401 can be utilized, in conjunction with the computing device utilization-to-power-consumption transfer function 421, to infer an inferred power consumption 431 of the computing device 401. More particularly, utilization 411 can be provided as input to the computing device utilization-to-power-consumption transfer function 421, which can, based on that input, output the inferred power consumption 431 of the computing device 401. In a like manner, the utilization 412 of the computing device 402 can be provided as input to computing device utilization-to-power-consumption transfer function 422 to infer an inferred power consumption 432 of the computing device 402. Similarly, the utilization 413 of the computing device 403 can be provided as input to the computing device utilization-to-power-consumption transfer function 423 to infer the inferred power consumption 433 of the computing device 403.

In one embodiment, the inferred power consumption of various computing devices can be aggregated into an aggregated power consumption of the group, or super-group of computing devices. For example, the computing devices 402 and 403 in the exemplary system 400 can be, for purposes of the present example, two computing devices that are both in a same pod of computing devices, such as in a data center. In such an example, it may be desirable to infer a power consumption of the pod as a whole. Consequently, in one embodiment, the inferred power consumption 432 of the computing device 402 can be aggregated with the inferred power consumption 433 of the computing device 403 to yield the aggregated power consumption 440 of the computing devices in the exemplary pod. As another example, the pod of computing devices 402 and 403 can be in the same rack as other computing devices, such as the computing device 401. As before, it can be desirable to infer a power consumption of the rack as a whole. Consequently, in one embodiment, the inferred power consumption 431 of the computing device 401 can be aggregated with the aggregated power consumption 440 of the computing devices 402 and 403 in the exemplary pod, to yield an aggregated power consumption 450 of the computing devices in a "super-group", which, as utilized herein, means a grouping of groups.

In the embodiment described in detail above, the utilization 411, 412 and 413 of the computing devices 401, 402 and 403, respectively, can be real-time utilization information that can be provided at approximately the same time at which the computing devices 401, 402 and 403 are being utilized at the indicated utilization levels. In another embodiment, however, utilization information, such as of the computing devices 401, 402 and 403, can be retained in a historical utilization database 460. In such an embodiment, the historical utilization of one or more of the computing devices whose utilization data is retained in the historical utilization database 460 such as, for example, the exemplary computing devices 401, 402 and 403, can be inferred "after the fact", or in a time substantially later then when the computing devices were being utilized in that manner. Thus, as illustrated in the exemplary system 400 of FIG. 4, the historical utilization 470 of a specific computing device can be obtained from the historical utilization database 460 and can be provided as input to a computing device utilization-to-power-consumption transfer function 480 that can be the computing device utilization-to-power-consumption transfer function for the computing device whose historical utilization 470 was selected from a historical utilization database 460. In such a manner a historical power consumption 490 of that computing device at the relevant point in time can be inferred.

In one embodiment, such inferred historical power consumption information can be utilized to generate a power consumption profile of one or more computing devices. As utilized herein, the term "power consumption profile" means information describing the manner in which a computing device typically consumes power such as, for example, whether such power consumption varies across a defined range, exhibits specific temporal patterns, such as increasing during daytime hours and decreasing during nighttime hours, or whether such power consumption is steady. A power consumption profile can be derived from inferred historical power consumption, but is not necessarily synonymous with. For example, a power consumption profile can indicate that a computing device consumes power in a daily cyclical rate, while a historical power consumption can indicate that on a specific date, and a specific time, the computing device was inferred to have consumed an inferred amount of power, irrespective of whether such an inferred power consumption is in accord with the power consumption profile for such a computing device. As will be described in detail below, the inferred historical power consumption, and the power consumption profile, of a computing device can be utilized, in conjunction with a current inferred power consumption of that computing device, to detect anomalies and provide preemptive notification of potential failures or inefficiencies.

Figure 5:
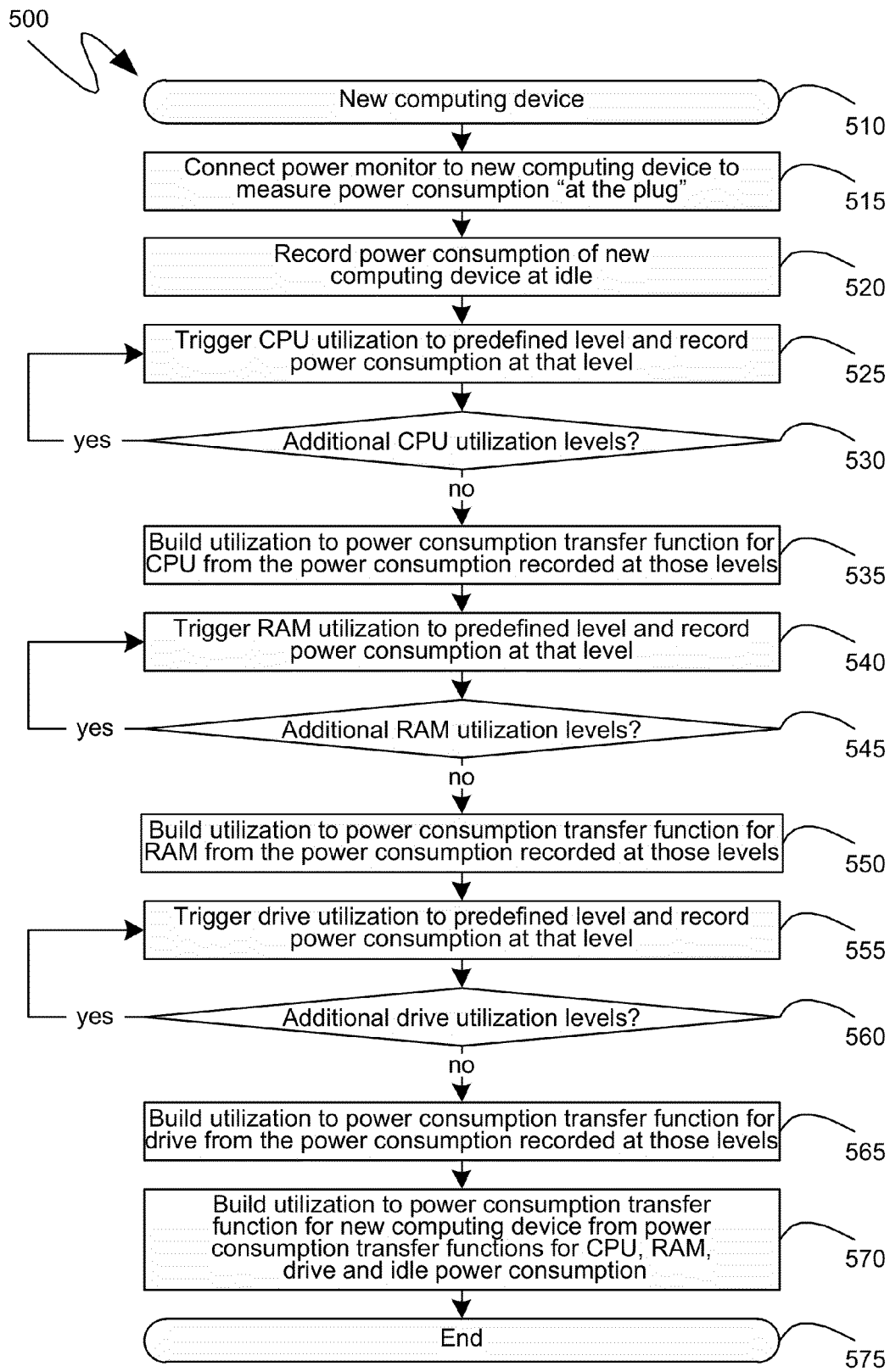
FIG. 5 is a flow diagram of an exemplary benchmarking of the power consumption of a computing device.

Turning to FIG. 5, the flow diagram 500 shown therein illustrates an exemplary series of steps that can be performed to generate a computing device utilization-to-power-consumption transfer function. Initially, at step 510, a new computing device can be received for which an analogous computing device has not already been tested and there exists no analogous computing device utilization-to-power-consumption transfer function. Subsequently, at step 515, an external power monitor can be connected to the new computing device to accurately measure the power being consumed by the computing device while it is tested. For example, in one embodiment, such an external power monitor can be connected, at step 515, to measure the power consumption of the computing device "at the plug".

Once the external power monitor is capable of measuring the computing device's power consumption, the computing device can be allowed to reach an idle state, such as when the computing device is awaiting external instructions to commence processing. The power consumption of the computing device at such an idle state can be recorded at step 520. Subsequently, at step 525, the CPU utilization of the computing device can be increased to a predefined level. For example, as indicated previously, the CPU utilization could be increased to a level commensurate with using 100% of the CPU's processing capabilities. Also at step 525 the power consumption of the computing device when the CPU utilization has reached the predefined level, can be recorded. At step 530, a determination can be made as to whether there are additional CPU utilization levels that should be benchmarked. If there are additional CPU utilization levels that should be benchmarked, processing can return to step 525, and CPU utilization commensurate with the new utilization level can be triggered. For example, once the power consumption of the computing device has been measured with 100% of the CPU's processing capabilities being utilized, the power consumption of the computing device can be measured with only 50% of the CPU's processing capabilities being utilized. In such an example, the return to step 525 can cause the triggering of the utilization of the CPU at the 50% level. Again, as before, the power consumption of the computing device at that time can be recorded as part of step 525.

Once the check, at step 530, indicates that there are no additional CPU utilization levels that are to be benchmarked, processing can proceed to benchmark another component of a computing device such as, for example, the RAM of the computing device. In one embodiment, such as that illustrated with the exemplary flow diagram 500 of FIG. 5, an intermediate step 535 can be performed to build a CPU utilization-to-power-consumption transfer function from the data collected during the various iterations of step 525, such as in the manner described in detail above. In an alternative embodiment, not illustrated, the step 535 can be performed "off-line" such as, for example, once all benchmarking has been completed.

At step 540 the utilization of another component of a computing device, such as the RAM of the computing device, can be triggered to be utilized at a predefined level. For example, as indicated previously, in one embodiment, at step 540, the utilization of the RAM of the computing device can be triggered such that the RAM is utilized at 100% of its capabilities. As part of step 540, the power consumption of the computing device while the RAM is being so utilized, can also be recorded. As before, processing can proceed to the check, at step 545, whether other RAM utilization levels should be benchmarked. As before, if, at step 545, it is determined that other RAM utilization levels are to be benchmarked, then processing can return to step 540. Conversely, if, at step 545, it is determined that no other RAM utilization levels need to be benchmarked, then processing can proceed to benchmark the power consumption of other components of the computing device.

As before, in one embodiment, upon completion of the benchmarking of the RAM power consumption, such as is performed by steps 540 and 545, an optional step of 550 can be performed, whereby a RAM utilization-to-power-consumption transfer function can be derived from the power consumption information, and RAM utilization levels, obtained by the execution of steps 540 and 545. In an alternative embodiment, the generation of the RAM utilization-to-power-consumption transfer function can be performed "off-line", or after the benchmarking of the computing device has been completed.

In one embodiment, at step 555, one or more storage media can be benchmarked to measure the power consumption of the computing device when such storage media are utilized at predefined utilization levels. Thus, at step 555, drive utilization can be triggered to a predefined utilization level such as, for example, by instructing the drive to read a defined collection of data, write a defined collection of data, or perform such reading and writing simultaneously. As also part of step 555, the power consumption of the computing device while the drive is being utilized in such a manner can be measured and recorded. As before, at step 560, a determination can be made as to whether there are other predefined utilization levels that are to be benchmarked. If, at step 560, it is determined that there are other such utilization levels, then processing can return to step 555 and trigger utilization of the drive at those levels and record the corresponding power consumption of the computing device.

In one embodiment, although not specifically illustrated in the flow diagram 500 of FIG. 5, a check can be made as to whether there are other components of the computing device from step 510 that are to be benchmarked. The exemplary flow diagram 500 shown in FIG. 5 is not meant to imply that the benchmarking of a computing device can be limited to the determination of the power consumption of the computing device as only the CPU, RAM, and drives of the computing device are utilized at predefined levels. Instead, in one embodiment, a computing device can be benchmarked by utilizing any component, at any predefined level, and recording the power consumption of the computing device while such component is being so utilized.

Once the benchmarking of the computing device is completed, in one embodiment, utilization-to-power-consumption transfer functions can be generated from the data collected. For example, as illustrated by step 565, a drive utilization-to-power-consumption transfer function can be generated from the information collected at steps 555 and 560. In another embodiment, as indicated previously, such a generation of individual component utilization-to-power-consumption transfer functions can be performed during the benchmarking process. At step 570 a computing device utilization-to-power-consumption transfer function can be generated from the individual component utilization-to-power-consumption transfer functions, such as those generated at steps 535, 550 and 565. Additionally, the computing device utilization-to-power-consumption transfer function generated at step 570 can also include the power consumption of the computing device at idle, as recorded at step 520. Once such a computing device utilization-to-power-consumption transfer function is generated at step 570, the relevant processing can end at step 575.

Figure 6:
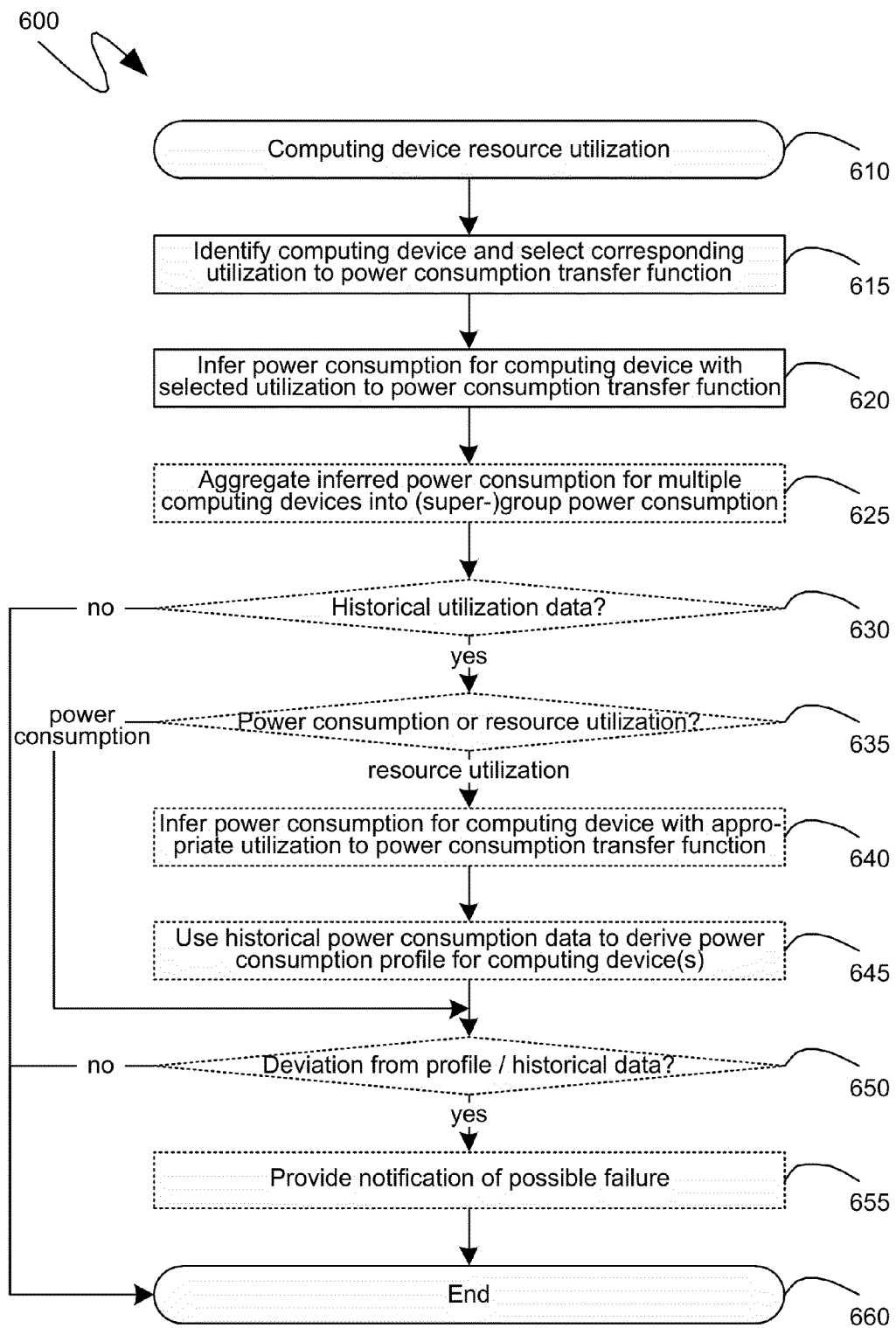
FIG. 6 is a flow diagram of an exemplary inferring of the power consumption of a computing device.

Turning to FIG. 6, the flow diagram 600 shown therein illustrates an exemplary series of steps by which a computing device utilization-to-power-consumption transfer function can be utilized to inform a power consumption of a computing device based on that computing devices utilization. Initially, as illustrated by the exemplary flow diagram 600 of FIG. 6, at step 610, a computing device can be utilized. As indicated previously, the utilization of various components in a computing device can be detected through mechanisms well known to those skilled in the art. Subsequently, at step 615, a computing device utilization-to-power-consumption transfer function can be selected that corresponds with the computing device whose utilization was received at step 610. Once such a computing device utilization-to-power-consumption transfer function is identified, at step 615, processing can proceed to step 620 and the identified computing device utilization-to-power-consumption transfer function can be utilized to further power consumption of a computing device given the utilization received at step 610.

Optionally, in one embodiment, at step 625, the inferred power consumption for multiple computing devices can be aggregated into group power consumption or super-group power consumption, to enable, for example, determination of a power consumption of a pod of computing devices, a rack of computing devices, or, indeed, an entire data center of computing devices.

Also optionally, at step 630, a determination can be made as to whether historical utilization data exists. If such data does not exist, then the relevant processing can end at step 660. However, if, at step 630, it is determined that historical utilization data for one or more computing devices exists, then the determination can be made, at step 635, as to whether that historical utilization data has already been processed into inferred historical power consumption information. If, at step 635, it is determined that such historical utilization data has already been processed into inferred power consumption information, then processing can proceed to step 650, skipping steps 640 and 645. Conversely, if, at step 635, it is determined that the historical utilization data has not already been processed, processing can proceed with step 640 where the historical power consumption of the computing devices whose historical utilization data was obtained at step 630, can be inferred by identifying the relevant computing device utilization-to-power-consumption transfer function in providing the historical utilization data as input to such a computing device utilization-to-power-consumption transfer function. Subsequently, at step 645, the historical power consumption data that was inferred at step 640 can be utilized to derive a power consumption profile for one or more computing devices.

Utilizing such a power consumption profile, and the historical data itself, a determination can be made, at step 650, whether the inferred power consumption, such as that obtained at step 620, is a deviation from what would have been expected for such a computing device given the power consumption profile in the historical data. For example, if the power consumption profile of the computing device is such that the computing device's power consumption cyclically varies throughout the day, in the inferred power consumption, from step 620, indicates that the computing device's power consumption has not changed for the whole day, then such an inferred power consumption can signal a possible failure such as, for example, a failed hardware component, or a failed software process, and, at step 655, a notification of such a possible failure can be provided. Similarly, if the historical data of the computing device indicates that the computing device rarely consumes more than a threshold level of power, in the inferred power consumption of the computing device, that was obtained at step 620, indicates that the computing device is currently consuming more than that threshold level of power, such indication can, again, be the representative of a possible failure and the notification of such a failure can be provided, at step 655. Subsequently, at step 660, the relevant processing can end. Alternatively, if, at step 650, it is determined that the inferred power consumption of the computing device does not deviate from either the power consumption profile nor the historical data of the computing device, then the processing can, again, end at step 660.

Steps 625 through 665 of the exemplary flow diagram 600 of FIG. 6 are illustrated using dashed lines to illustrate that they are optional steps. Thus, in one embodiment, once a power consumption for computing device has been inferred, such as at step 620, based on the utilization of that computing device, such as that received at step 610, such an inferred power consumption can be noted and, optionally, displayed to the user, and the relevant processing can end at step 660.

As can be seen from the above description, techniques for inferring the power consumption of a computing device have been presented. In view of the many possible variations of the subject matter described herein, we claim as our invention all such embodiments as may come within the scope of the following claims and equivalents thereto.

I claim:

1. One or more computer-readable memory comprising computer-executable instructions for generating a utilization-to-power-consumption transfer function for a computing device, the computer-executable instructions directed to steps comprising:
   recording a measured idle power consumption of the computing device while the computing device is idling, the measured idle power consumption having been measured by a power monitor that is external to the computing device and independent of the computing device;
   triggering a utilization of a first hardware component of the computing device such that the first hardware component is utilized at a first predefined utilization level;
   recording a measured first power consumption of the computing device while the first hardware component of the computing device is being utilized at the first predefined utilization level, an identification of the first hardware component, and the first predefined utilization level;
   repeating the triggering and the recording for subsequent predefined utilization levels of the first hardware component that differ from the first predefined utilization level;
   generating a first hardware component utilization-to-power-consumption transfer function from the recorded power consumption of the computing device while the first hardware component was being utilized at the predefined levels and the recorded utilization levels of the first hardware component; and
   generating a computing device utilization-to-power-consumption transfer function by aggregating the first hardware component utilization-to-power-consumption transfer function and the recorded idle power consumption of the computing device.

2. The computer-readable memory of claim 1, comprising further computer-executable instructions for:
   triggering a utilization of a second hardware component of the computing device that is different from the first hardware component of the computing device such that the second hardware component is utilized at a first predefined utilization level;
   recording a measured second power consumption of the computing device while the second hardware component of the computing device is being utilized at the first predefined utilization level, an identification of the second hardware component, and the first predefined utilization level;
   repeating the triggering and the recording for subsequent predefined utilization levels of the second hardware component that differ from the first predefined utilization level; and
   generating a second hardware component utilization-to-power-consumption transfer function from the recorded power consumption of the computing device while the second hardware component was being utilized at the predefined levels and the recorded utilization levels of the second hardware component;
   wherein the generating the computing device utilization-to-power-consumption transfer function further comprises aggregating the second hardware component utilization-to-power-consumption transfer function with the first hardware component utilization-to-power-consumption transfer function and the recorded idle power consumption of the computing device.

3. The computer-readable memory of claim 1, wherein the first hardware component is one or more central processing units of the computing device.

4. The computer-readable memory of claim 1, wherein the first hardware component is a random access memory of the computing device.

5. The computer-readable memory of claim 1, wherein the first hardware component is one or more drives of the computing device.

6. The computer-readable memory of claim 5, wherein the first predefined utilization level is one of: a reading of data, a writing of data, or a simultaneous reading and writing of data; and wherein further the subsequent predefined utilization levels are others of: the reading the data, the writing the data or the simultaneous reading and writing of the data.

7. One or more computer-readable memory comprising computer-executable instructions for inferring a power consumption of a computing device from utilization information indicating a utilization of at least one hardware component of the computing device, the computer-executable instructions directed to steps comprising:
   obtaining the utilization information indicating the utilization of the at least one hardware component of the computing device;
   identifying a computing device utilization-to-power-consumption transfer function of a tested computing device that is equivalent to the computing device from which the utilization information was obtained;
   providing the obtained utilization information as input to the identified computing device utilization-to-power-consumption transfer function;
   generating the inferred power consumption of the computing device from an output of the identified computing device utilization-to-power-consumption transfer function corresponding to the input of the obtained utilization information;
   comparing the inferred power consumption of the computing device to a historical power consumption of the computing device and to a power profile of the computing device that was derived from the historical power consumption; and
   generating a notification if the inferred power consumption of the computing device deviates from either the power profile of the computing device or from the historical power consumption of the computing device.

8. The one or more computer-readable memory of claim 7, wherein the obtained utilization information is a historical utilization information of the computing device indicating a utilization of the computing device in the past.

9. The one or more computer-readable memory of claim 8, comprising further computer-executable instructions for generating a power profile of the computing device from the inferred power consumption of the computing device that is inferred from the historical utilization information.

10. The one or more computer-readable memory of claim 7, comprising further computer-executable instructions for generating an inferred power consumption of a group of computing devices by aggregating an inferred power consumption of each computing device in the group of computing devices.

11. The one or more computer-readable memory of claim 7, wherein the comparing either reveals that the historical power consumption varies cyclically over a period of time while the inferred power consumption has remained consistent for the period of time or reveals that the historical power consumption remains below a threshold while the inferred power consumption has exceeded the threshold.

12. A system comprising:
a first computing device whose power consumption will be inferred from utilization information indicating a level of utilization of one or more components of the first computing device;
a first computer-readable memory that will be communicationally coupled to the first computing device to benchmark the first computing device, the first computer-readable storage medium comprising computer-executable instructions for:
  recording a measured idle power consumption of the first computing device while the first computing device is idling, the measured idle power consumption having been measured by a power monitor that is external to the first computing device and independent of the first computing device;
  triggering a utilization of a first hardware component of the first computing device such that the first hardware component is utilized at a first predefined utilization level;
  recording a measured first power consumption of the first computing device while the first hardware component of the first computing device is being utilized at the first predefined utilization level, an identification of the first hardware component, and the first predefined utilization level;
  repeating the triggering and the recording for subsequent predefined utilization levels of the first hardware component that differ from the first predefined utilization level;
  generating a first hardware component utilization-to-power-consumption transfer function from the recorded power consumption of the computing device while the first hardware component was being utilized at the predefined levels and the recorded utilization levels of the first hardware component; and
  generating a first computing device utilization-to-power-consumption transfer function by aggregating the first hardware component utilization-to-power-consumption transfer function and the recorded idle power consumption of the first computing device; and
a power consumption inferring computing device executing computer-executable instructions that, when executed, perform steps comprising:
  obtaining the utilization information from the first computing device;
  identifying the first computing device utilization-to-power-consumption transfer function;
  providing the obtained utilization information as input to the identified first computing device utilization-to-power-consumption transfer function; and
  generating the inferred power consumption of the first computing device from an output of the identified first computing device utilization-to-power-consumption transfer function corresponding to the input of the obtained utilization information.

13. The system of claim 12, further comprising a second computing device, equivalent to the first computing device, whose power consumption will be inferred from utilization information indicating a level of utilization of one or more components of the second computing device;
wherein the power consumption inferring computing device executes further computer-executable instructions that, when executed, perform steps comprising:
  obtaining the utilization information from the second computing device;
  identifying the first computing device utilization-to-power-consumption transfer function;
  providing the obtained utilization information as input to the identified first computing device utilization-to-power-consumption transfer function; and
  generating the inferred power consumption of the second computing device from an output of the identified first computing device utilization-to-power-consumption transfer function corresponding to the input of the obtained utilization information.

14. The system of claim 13, wherein the power consumption inferring computing device executes further computer-executable instructions that, when executed, generate an inferred power consumption of a group of computing devices comprising the first computing device and the second computing device by aggregating the inferred power consumption of the first computing device and the inferred power consumption of the second computing device.

15. The system of claim 12, wherein the first computer-readable storage medium comprises further computer-executable instructions for:
  triggering a utilization of a second hardware component of the first computing device that is different from the first hardware component of the first computing device such that the second hardware component is utilized at a first predefined utilization level;
  recording a measured second power consumption of the first computing device while the second hardware component of the first computing device is being utilized at the first predefined utilization level, an identification of the second hardware component, and the first predefined utilization level;
  repeating the triggering and the recording for subsequent predefined utilization levels of the second hardware component that differ from the first predefined utilization level; and
  generating a second hardware component utilization-to-power-consumption transfer function from the recorded power consumption of the first computing device while the second hardware component was being utilized at the predefined levels and the recorded utilization levels of the second hardware component;
  wherein the generating the first computing device utilization-to-power-consumption transfer function further comprises aggregating the second hardware component utilization-to-power-consumption transfer function with the first hardware component utilization-to-power-consumption transfer function and the recorded idle power consumption of the first computing device.

16. The system of claim 12, wherein the first hardware component is one or more drives of the first computing device.

17. The system of claim 16, wherein the first predefined utilization level is one of: a reading of data, a writing of data, or a simultaneous reading and writing of data; and wherein further the subsequent predefined utilization levels are others of: the reading the data, the writing the data or the simultaneous reading and writing of the data.

18. The system of claim 12, wherein the obtained utilization information is a historical utilization information of the first computing device indicating a utilization of the first computing device in the past.

19. The system of claim 18, wherein the power consumption inferring computing device executes further computer-executable instructions that, when executed, generate a power profile of the first computing device from the inferred power consumption of the first computing device that is inferred from the historical utilization information.

20. The system of claim 12, wherein the power consumption inferring computing device executes further computer-executable instructions that, when executed, perform steps comprising:
   comparing the inferred power consumption of the first computing device to a historical power consumption of the first computing device and to a power profile of the first computing device that was derived from the historical power consumption; and
   generating a notification if the inferred power consumption of the first computing device deviates from either the power profile of the first computing device or from the historical power consumption of the first computing device.

* * * * *